Feb. 8, 1966  C. R. WISCHMEYER  3,234,504
METHOD AND APPARATUS FOR CONTINUOUS WAVE SEISMIC PROSPECTING
Filed Aug. 27, 1962
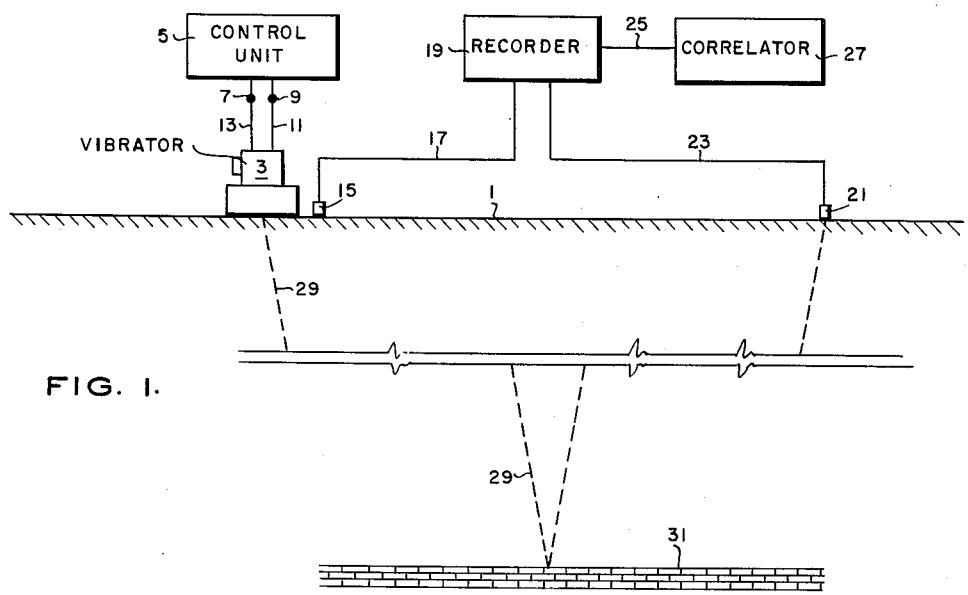
FIG. 1.
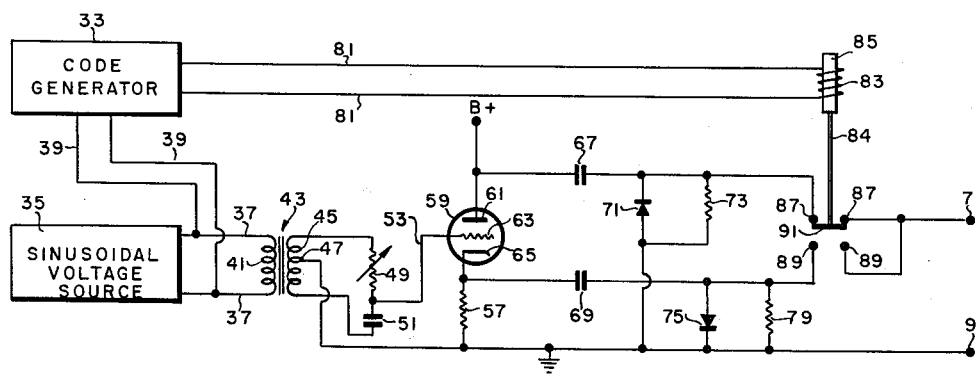
FIG. 2.

FIG. 3B.  0  1  0  1  1  0

FIG. 3D.
FIG. 3E.
INVENTOR.
CARL R. WISCHMEYER,
BY John B. Davidson
ATTORNEY.

3,234,504
METHOD AND APPARATUS FOR CONTINUOUS
WAVE SEISMIC PROSPECTING
Carl Rieble Wischmeyer, Houston, Tex., assignor, by mesne assignments, to Esso Production Research Company, Houston, Tex., a corporation of Delaware
Filed Aug. 27, 1962, Ser. No. 219,547
4 Claims. (Cl. 340—15.5)

This invention relates to the art of seismic prospecting, and more particularly to seismic prospecting techniques wherein elongated wave trains of seismic signals are injected into the earth.

In the usual type of seismic prospecting, a relatively sharp pulse of elastic wave energy is injected into the earth from a location at or near the earth's surface, and the resulting seismic waves are detected by means of geophones located at a plurality of detecting stations or locations spaced apart on the earth's surface. Electrical output signals from the geophones are simultaneously recorded to form a multiple trace seismogram. The seismogram is examined and operated on in various ways to pick out reflected, refracted, and diffracted waves therein that are indicative of the nature of subsurface strata. In order to determine the depth of a given stratum, the two-way travel time of the seismic waves between the earth's surface and the stratum (as well as the velocity of the waves in the strata through which the waves travel) must be measured very exactly. In this method of seismic prospecting, all of the elastic wave energy is injected into the earth at substantially the same time, and undesired components of the traces of the seismograms may be eliminated by frequency discrimination.

In another type of seismic prospecting that has found relatively limited use to date, an elongated vibratory seismic signal or wave train is injected into the earth. Preferably, the injected seismic signal is nonrepetitive during a time interval which is substantially longer than the travel time of the signal along the longest travel path of interest. Expressed in another manner, the duration of the signal is at least as long as the travel time of the signal along any of the paths by which it reaches a detecting location at usable energy levels. In the usual case in reflection seismography, the longest travel path of interest will be the shortest path from the seismic wave source to the deepest reflecting horizon which it is desired to delineate and back to the earth's surface at the detecting location farthest removed from the seismic source. Seismic waves produced by the vibratory seismic signal are detected at one or more detecting locations removed from the injecting location. It has been the practice to produce a counterpart electrical replica of the injected signal (i.e., an electrical signal substantially identical to the injected seismic signal) by means of a geophone at the injecting location. This geophone may be either connected to the vibratory source or positioned in the earth near the source. The replica signal is cross correlated with each signal produced at the detecting stations. The cross correlation is carried out at a plurality of time-phase relationships between said each signal and the replica signal. Of the replica signal and each signal cross correlated therewith, the time-phase relationship which yields the greatest value of correlation is used as a measure or parameter of the travel time of the injected signal from the injecting location to the detecting location corresponding to said each signal. Correlation of the replica signal and an electrical signal representative of detected seismic waves typically has been accomplished by initially recording both signals, reproducing the signal at time series, combining the time series and emphasizing amplitude variations in the combined time series, and integrating the resulting signal while shifting the time-phase relationship (or $\tau$) between the reproduced signals with respect to their time-phase relationship as originally recorded. The general method is described in U.S. Patent No. 2,989,726, Crawford et al., and will be recognized as being of the type operating in the time domain.

A form of injected signal that has been widely used in the above-described method is that of a sinusoid which is continuously varied in frequency so as to be nonrepetitive over a desired time interval. The cross correlation curve resulting from a given reflection obtained with such a signal is that of a major lobe flanked by minor lobes diminishing in amplitude and extending from the major lobe in both directions on the "$\tau$" axis of the correlation curve. The side lobes may be of sufficient amplitude to mask all of the lobes of a relatively smaller amplitude correlation signal resulting from a reflection from a relatively poor reflecting horizon located near a good reflecting horizon. A much better type of injected seismic signal is a signal having an amplitude density spectrum given by the formula $$\frac{\operatorname{Sin} X}{X}$$

where X represents frequency over a preselected frequency spectrum. Preferably, this type of seismic signal is formed according to a binary code of maximal length. The term "binary code of maximal length" signifies a binary code which may be represented as a reference time series, which code is formed by operating on a binary code group of N digits according to a predetermined rule of formation such that the code group will repeat itself every $(2^N-1)$ digits, and not before. Expressed in another manner, a binary code group of maximal length is a binary code wherein a binary group of N digits at the beginning thereof is not repeated until the code has $(2^N-1)$ digits therein. For example, if the code group 01101 is used, N will be equal to 5 and $(2^N-1)$ equals 31. A binary code of maximal length can be formed therefrom by starting off with 01101 and setting the next element equal to the sum modulo 2 of the first, second, third, and fifth digits preceding it. The process is repeated for each successive element and the following binary code is obtained:

0110100011001001111101110001U1

By applying the above-specified rule of formation, it will be found that after 31 elements, the sequence will repeat. For a more complete discussion of shift register or null sequence codes of maximal length, reference may be had to the following: "The Synthesis of Linear Sequential Coding Networks" by D. A. Huffman, Proc. Third London Symposium on Information Theory, September 1955; and "Several Binary-Sequence Generators" by N. Zierler, Tech. Rep. 95, Lincoln Laboratory, Massachusetts Institute of Technology, Cambridge, Massachusetts, September 1955.

Injecting a binary code of maximal length into the earth in the form of a seismic signal presupposes that a characteristic of the seismic signal is variable between two distinct conditions. For example, the amplitude may be varied between two magnitudes or the phase may be varied between two phase relationships.

In the past the injected signal usually has been a constant frequency sinusoidal signal of constant amplitude, the phase of which is varied between mutually opposite phase relationships. The phase is varied in accordance with a binary code of maximal length having a time duration at least equal to twice the travel time of seismic waves between the earth's surface and the deepest earth reflecting horizon of interest. At low frequencies (less than about 40 cycles per second), this type of signal produces satisfactory results, but at higher frequencies, the results become increasingly less satisfactory. The reason is believed to be that the earth is unable to respond to sudden reversals in the sense or direction of amplitude change such as occurs when a sinusoidal signal is switched between mutually opposed phase relationships. Inspection of the waveform of a sinusoid switched back and forth between opposite phase relationships thereof shows that either a cusp or a discontinuity is formed at the instant of phase reversal. The inability of the earth to accept such a cusp or discontinuity from a signal injected thereinto apparently increases as the frequency of the signal increases. Therefore, the correlation between the injected signal and reflected events in the detected signal materially suffers as the frequency of the injected signal is increased.

In accordance with the present invention, an electrical analog representation of a binary bit is formed having a waveform with substantially zero slope at zero amplitude at the beginning and end thereof and which is completely continuous therebetween. A continuous signal is formed using the electrical analog of a binary bit to form an electrical analog of a binary code of maximal length wherein a characteristic of said electrical analog is modulated between two states thereof in accordance with the binary code of maximal length.

In accordance with the apparatus aspects of the invention, there is provided an electrical code generator for producing an output signal having a characteristic variable between first and second amplitudes in accordance with a binary code of maximal length (each bit of which has predetermined bit duration) responsive to reception of an alternating voltage thereby. Further provided are electrical signal producing means having first and second output circuits for producing a first sinusoidal voltage of given polarity in the first output circuit which is variable between zero amplitude and a given amplitude, and a second sinusoidal output voltage of opposite polarity in the second output circuit which is variable between zero amplitude and a given amplitude and of opposite phase relationship relative to the first output voltage whereby the first and second output voltages are of zero amplitude at the same instant. The bit duration is the same as the period of the sinusoidal voltages. The electrical signal producing means includes means for synchronizing the moments at which the sinusoidal voltages are of zero amplitude with the moment at which the code generator output signal changes from one amplitude to another. Further provided is switching means connected to the code generator for connecting the output circuits to an electroacoustic transducer when the code generator output signal is of one amplitude, and for connecting the second output circuit of the signal producing means to the electroacoustic transducer when the code generator output signal is of the second amplitude whereby the electroacoustic transducer is supplied with a control signal having a waveform with no discontinuities and having zero slope at zero amplitude.

Objects and features of the invention not apparent from the above discussion will become evident upon consideration of the following detailed description thereof taken in connection with the accompanying drawing, wherein:

FIG. 1 is a schematic drawing of apparatus carrying out a seismic observation in accordance with the invention;

FIG. 2 is an electrical schematic diagram of control apparatus in accordance with the invention; and FIGS. 3A through 3E are waveforms useful in understanding the operation of the apparatus of FIG. 2.

Figure 3A:
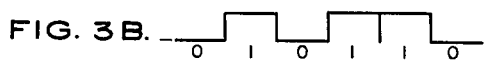

With reference now to FIG. 1, there is shown disposed on the earth's surface an electroacoustic transducer or vibrator 3 and a geophone 15 positioned at a transmitting location on the earth's surface, and a reflection geophone 21 positioned at a detecting location on the earth's surface. In accordance with usual practice in seismology, a plurality of geophones may be used at the detecting location rather than the single geophone 21, which geophones are interconnected to produce a single electrical signal to effectively cancel all except substantially upcoming seismic waves. Also in accordance with usual practice, more than one detecting location may be used which may be spaced apart on either or both sides of the location of vibrator 3 and geophone 15. The function of geophone 15 is to produce an electrical counterpart or replica of the signal transmitted into the earth by vibrator 3. The vibrator 3 may be any of a number of types of vibrators well known to the art, and preferably is an electrohydraulic vibrator such as is manufactured by the M. B. Electronics Company of New Haven, Connecticut, and by the Ling Electronics Company of Anaheim, California. Such vibrators utilize a hydraulically actuated piston to vibrate an object and to control the hydraulic force on the piston in accordance with vibrations in the amplitude of a relatively small amplitude electrical signal connected thereto. The vibrator 3 is coupled to a vibratory control unit 5 by electrical leads 11 and 13. The vibratory control unit 5 is provided with output terminals 7 and 9 to which leads 11, 13 are connected. The vibratory control unit may be an apparatus such as is illustrated in FIG. 2 and described below, or may be a magnetic tape reproducing unit. In the latter case, the apparatus of FIG. 2 may be used to prerecord on the magnetic tape an electrical output signal having the waveform described below so that the resulting signal can be repetitively reproduced by the magnetic tape reproducing unit to perform a plurality of seismic observations.

The electrical output signals of replica geophone 15 and reflection geophone 21 are individually connected to recording heads (not shown) on recorder 19. Recorder 19 may be a magnetic tape recorder or other type of apparatus well known to the art, adapted to record and subsequently repetitively reproduce electrical signals coupled thereto. Reproduced signals from recorder 19 are fed to an electrical correlator 27 by lead or leads 25. Electrical correlator 27 may be of the type described in U.S. Patent No. 2,927,656, Feagin et al., or in application Serial No. 186,124, filed April 9, 1962, by H. T. Masterson et al., now U.S. Patent No. 3,185,958, and assigned to the assignee of the present invention. The function of correlator 27 is to provide an output signal or recordation indicative of the cross correlation between the electrical signals produced by geophones 15 and 21 at a multiplicity of time-phase relationships therebetween.

With reference now to FIG. 2, there is shown a sinusoidal voltage source 35 having output leads 37 connected to the primary 41 of a transformer 43. Serially connected variable resistor 49 and capacitor 51 are serially connected across the terminals of the secondary winding 45 of transformer 43. The grid electrode 63 of a vacuum tube 59 is connected by lead 53 to the juncture of resistor 49 and capacitor 51. The cathode 65 of vacuum tube 59 is connected to the center tap 47 of transformer 43 through resistor 57. The plate 61 of vacuum tube 59 is connected to the positive terminal of a high voltage source, the negative terminal of which is connected to center tap 47. Plate 61 is coupled by capacitor 67 to a clamp circuit including parallel connected diode 71 and resistor 73. Diode 71 is poled to prevent the voltage thereacross from going negative with respect to ground. Similarly, the voltage appearing across resistor 57 is coupled to a clamp circuit including diode 75 and resistor 79 by a capacitor 69. Diode 75 is poled to prevent the voltage thereacross from going positive with respect to ground. Manifestly, the voltage appearing across the clamp circuit including diode 71 will be 180° out of phase with the voltage appearing across the clamp circuit including diode 75. The function of transformer 43, resistor 49, and capacitor 51 is to provide a phase-shifting circuit for adjusting the phase relationship of the voltage coupled to vacuum tube 59. The phase of this voltage relative to the voltage appearing across primary 41 may be adjusted within limits by varying the resistance of variable resistor 49.

The output voltage of sinusoidal voltage source 35 is coupled to a code generator 33 by leads 39. Code generator 33 is a device which produces an output signal variable between two amplitudes in accordance with a binary code of maximal length. Suitable apparatus for this purpose is described in an article entitled "Shift Registers," by P. H. R. Scholefield, appearing in the periodical Electronic Technology, October 1960, page 389. The output signal of the code generator may be a D.C. signal variable between zero amplitude and a given amplitude. The output signal appearing on leads 81 is connected to the control winding 83 of relay 84. This relay has an armature 85, a contactor 91, normally-closed contacts 87, and normally-open contacts 89. When winding 83 is energized, contactor 91 is moved downwardly to open contacts 87 and close contacts 89.

The signal appearing across diode 71 is coupled ot output terminal 7 when contacts 87 are closed, and the signal appearing across diode 75 is coupled between output terminals 7 and 9 when contacts 89 are closed.

The code generator 33 is adapted to produce an electrical replica of a binary bit upon every full cycle of the sinusoidal voltage coupled thereto on leads 39. In operation, the resistor 49 is adjusted until the signal coupled to grid electrode 63 is substantially 90 electrical degrees out of phase with the voltage coupled to the primary of primary winding 41 of transformer 43.

Figure 3C:

With reference now to FIGS. 3A through 3E, in FIG. 3A there is shown a sinusoidal waveform such as may appear on leads 39. FIG. 3B represents the output signal appearing on leads 81 responsive to the signal shown in FIG. 3C represents the voltage waveform appearing across diode 71 when resistor 49 is adjusted as described above, and FIG. 3D represents the voltage waveform simultaneously appearing across diode 75. Manifestly, when code generator 33 has zero output voltage, as will occur during the periods designated by the binary bits "0" in FIG. 3B, contacts 87 will be bridged by contactor 91 so that the voltage waveform across diode 71 is coupled to terminals 7, 9. During the periods when a voltage of given amplitude appears across leads 81, as during the intervals represented by the binary bits "1" in FIG. 3B, relay 84 will close contacts 89 so that the voltage appearing across diode 75 is coupled to terminals 7, 9. Therefore, the voltage appearing across terminals 7, 9 will be a composite of the voltage waveforms of FIGS. 3C and 3D in accordance with the binary code produced by code generator 33 and will have the waveform depicted in FIG. 3E. As can be readily seen, this waveform is of zero slope at zero amplitude and is substantially continuous between the instants at which it is of zero amplitude. In effect, the waveform of each binary bit is represented by the formula $f(t)=A(1-\cos \omega t)$ for $0<\omega t<2\pi$ (zero elsewhere). As indicated above, the apparatus of FIG. 2 may be used either to drive vibrator 3 directly or to record on magnetic tape a trace in accordance with the signal appearing across terminals 7, 9. In either event, the output signal produced by the apparatus of FIG. 2 will be used to drive vibrator 3. When vibrator 3 is thus driven, a seismic signal which is injected into the earth is variable in amplitude in accordance with the variations in amplitude of the output signal of the apparatus of FIG. 2. The signal will follow various and sundry paths through the earth and immediately will be detected by replica geophone 15. The geophone 15 will produce an output signal substantially identical to the signal injected into the earth by vibrator 3. Some of the energy will follow the ray path 29, will be reflected from a subterranean horizon 31, and will be detected by geophone 21. The two signals will be simultaneously recorded and thereafter will be repetitively reproduced with a plurality of time-phase relationships therebetween. The reproduced signals will be cross correlated by correlator 27 to produce an output signal or indication that is indicative of the correlation between the reproduced signal for each time-phase relationship therebetween. Extremes in the correlation indications will be indicative of the two-way travel time of seismic waves through the earth as reflected by sub-surface reflecting horizons in the usual manner in continuous wave prospecting.

The invention is not to be restricted to the specific structural details, arrangement of parts, or circuit connections herein set forth, as various modifications thereof may be effected without departing from the spirit and scope of this invention.

The objects and features of the invention having been completely described, what I wish to claim is:

1. In the method of measuring the travel time along at least one path of propagation through the earth between spaced apart first and second points on the earth of a vibratory signal which is non-repetitive during a time interval substantially longer than the travel time of said signal along any of those paths of its propagation through the earth by which it reaches said second point at usable energy levels, and wherein is produced an electrical replica of the transmitted vibratory signal and an electrical signal representative of the vibratory signal as received at said second point, and wherein the electrical replica of the transmitted vibratory signal and the electrical signal representative of the vibratory signal as received at said second point are cross corelated with a multiplicity of time-phase relationships therebetween, the improvement which comprises:

producing a binary code of maximal length wherein a code group of N binary bits is not repeated for $(2^N-1)$ bits;

forming an electrical analog of a binary bit having a waveform with substantially zero slope at zero amplitude at the beginning and end thereof and completely continuous therebetween;

forming an electrical analog of said binary code of maximal length by varying a characteristic of the electrical analog of said binary bit between two states thereof in accordance with said binary code of maximal length; and forming said vibratory seismic signal by driving an electroacoustic transducer with said electrical analog of said binary code of maximal length.

2. In the method of measuring the travel time along at least one part of propagation through the earth between spaced apart first and second points on the earth of a vibratory signal which is nonrepetitive during a time interval substantially longer than the travel time of said signal along any of those paths of its propagation through the earth by which it reaches said second point at usable energy levels, and wherein is produced an electrical replica of the transmitted vibratory signal and an electrical signal representative of the vibratory signal as received at said second point, and wherein the electrical replica of the transmitted vibratory signal and the electrical signal representative of the vibratory signal as received at said second point are cross correlated with a multiplicity of time-phase relationships therebetween, the improvement which comprises:

producing a binary code of maximal length wherein a code group of N binary bits is not repeated for $(2^N-1)$ bits;

forming an electrical analog of a binary bit having a waveform given by the relationship $A(1-\cos \omega t)$ where A is a constant arbitrarily assigned value and "$t$" is time;

forming an electrical analog of said binary code of maximal length with said binary bit by varying a characteristic of said electrical analog of the binary bit between two states thereof in accordance with said binary code of maximal length; and driving an electroacoustic transducer with said electrical analog of said binary code of maximal length.

3. For use in a system of continuous wave prospecting wherein a continuous vibratory signal is injected into the earth and detected at a remote location, and wherein the detected signal is cross correlated with a replica of the transmitted signal at a plurality of time-phase relationships therebetween to produce an output signal indicative of the correlation between the transmitted signal and the detected signal, the vibratory signal being injected into the earth with an electroacoustic transducer, means for producing an electrical signal for driving the electroacoustic transducer comprising:

an electrical source of sinusoidal, constant amplitude alternating output voltage;

electrical code generator means connected to said electrical source for producing an output signal having a characteristic variable between first and second amplitudes in accordance with a binary code of maximal length having predetermined bit duration, responsive to reception of an alternating voltage thereby, the bit duration of said binary code being timed to coincide with the period of the alternating voltage signal of said electrical source;

output terminal means;

circuit means having an input circuit and first and second output circuits, for producing in said first output circuit a first sinusoidal voltage signal of one polarity variable between zero amplitude and a given amplitude, and for producing in said second output circuit a second sinusoidal voltage signal of opposite polarity variable between zero amplitude and said given amplitude, responsive to reception thereby of a sinusoidal input signal in said input circuit;

phase-adjusting means for coupling the output of said electrical source to said input circuit; and means connected to said code generator means for coupling said first output circuit to said output terminals when the output signal of said code generator means is of said first amplitude, and for coupling said second output circuit to said output terminals when said output signal of said code generator means is of said second amplitude.

4. For use in a system of continuous wave prospecting wherein a continuous vibratory signal is injected into the earth and detected at a remote location, and wherein the detected signal is cross correlated with a replica of the transmitted signal at a plurality of time-phase relationships therebetween to produce an output signal indicative of the correlation between the transmitted signal and the detected signal, the vibratory signal being injected into the earth with an electroacoustic transducer, means for producing an electrical signal for driving the electroacoustic transducer comprising:

electrical code generator means connected to said electrical source for producing an output signal having a characteristic variable between first and second amplitudes in accordance with a binary code of maximal length having predetermined bit duration, responsive to reception of an alternating voltage thereby, the bit duration of said binary code being timed to coincide with the period of the alternating voltage signal of said electrical source;

electrical signal-producing means having first and second output circuits for producing a first sinusoidal output voltage of given polarity in said first output circuit variable between zero amplitude and a given amplitude, and a second sinusoidal output voltage of opposite polarity in said second output circuit variable between zero amplitude and said given amplitude and of opposite phase relationship relative to said first sinusoidal output voltage whereby said first and second sinusoidal output voltages are of zero amplitude at the same instant, the period of said sinusoidal voltages being the same as said bit duration, said electrical signal-producing means including means for synchronizing the moments at which said sinusoidal voltages are of zero amplitude with the moment at which said code generator output signal changes from one amplitude to another;

output terminal means; and switch means connected to said code generator means for connecting said first output circuit to said output terminal means when said code generator output signal is of said first amplitude, and for connecting said second output circuit to said output terminal means when said code generator output signal is of said second amplitude.

References Cited by the Examiner

UNITED STATES PATENTS

| | | | |
|---|---|---|---|
| 2,968,022 | 1/1961 | Unterberger | 340—15.5 |
| 2,989,726 | 6/1961 | Crawford et al. | 340—15.5 |
| 3,000,461 | 9/1961 | Hasbrook | 181—.5 X |
| 3,015,086 | 12/1961 | Heintz | 340—15.5 |
| 3,063,034 | 11/1962 | Lee | 340—15.5 |
| 3,097,340 | 7/1963 | Dobbie | 328—61 |
| 3,117,305 | 1/1964 | Goldberg | 325—30 |

BENJAMIN A. BORCHELT, *Primary Examiner.*

SAMUEL FEINBERG, CHESTER L. JUSTUS,
*Examiners.*